United States Patent Office 3,215,729
Patented Nov. 2, 1965

3,215,729
PHENYL ESTER OF 2,3,6-TRICHLORO-PHENYLACETIC ACID
Jack S. Newcomer, Wilson, Edward D. Weil, Lewiston, and Edwin Dorfman, Grand Island, N.Y., assignors to Hooker Chemical Corporation, Niagara Falls, N.Y., a corporation of New York
No Drawing. Filed Apr. 6, 1961, Ser. No. 101,061
1 Claim. (Cl. 260—476)

This application is a continuation-in-part of Serial Number 730,051, filed in the United States Patent Office, April 22, 1958, now abandoned.

This invention describes herbicidal compositions of matter derived from 2,3,6-trichlorophenylacetic acid and to a process for preparing them. More specifically, this invention relates to the phenyl and substituted phenyl esters of 2,3,6-trichlorophenylacetic acid which have superior characteristics as herbicides and soil sterilants as compared to the 2,3,6-trichlorophenylacetic acid and its esters of aliphatic monohydric alcohols. The compositions of this invention are included within the scope of the structure below:

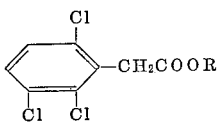

wherein R is an organic aromatic radical selected from the group consisting of phenyl, substituted phenyl, and polysubstituted phenyl, preferably phenyl.

Among the many compounds intended to be within the purview of this invention are: phenyl 2,3,6-trichlorophenylacetate, cresyl 2,3,6-trichlorophenylacetate, pentachlorophenyl 2,3,6 - trichlorophenylacetate, p-chlorophenyl 2,3,6-trichlorophenylacetate, o-chlorophenyl 2,3,6-trichlorophenylacetate, 2,4-dichlorophenyl 2,3,6-trichlorophenylacetate, 2,4,5-trichlorophenyl 2,3,6-trichlorophenylacetate, 2,4,6-trichlorophenyl 2,3,6-trichlorophenylacetate, o-hydroxyphenyl 2,3,6-trichlorophenylacetate, β-naphthyl 2,3,6-trichlorophenylacetate, α-naphthyl 2,3,6-trichlorophenylacetate, p-tert-butylphenyl 2,3,6-trichlorophenylacetate, o-carboxyphenyl 2,3,6-trichlorophenylacetate, o-octylphenyl 2,3,6-trichlorophenylacetate, p-octylphenyl 2,3,6-trichlorophenylacetate, and resorcinol bis-(2,3,6-trichlorophenylacetate).

The high cost of labor and farm machinery have made the hand or machine suppression or eradication of weeds economically unfeasible. For this reason, there has become an increasing tendency on the part of growers to rely more and more on chemical control of weeds through the use of herbicides. Since herbicides structurally comprise many diverse classes of substances, it is not surprising that different crops differ markedly in their sensitivity or resistance to the vast number of herbicides now in commercial use. Thus, while a high degree of phytotoxicity against a broad spectrum of weeds, selectivity and ease of formulation are still the sine qua non of a herbicide, the volatility and persistence of a herbicide play an important part in its commercial acceptance. High volatility particularly, is a serious drawback to the use of herbicides in areas where there are herbicide-sensitive crops planted close to an area in which herbicide use is desired. For example, 2,4-dichlorophenoxyacetic acid (2,4-D), and its esters, are especially phytotoxic toward certain broadleaf crops, such as cotton, soybeans, tobacco and tomatoes. Unfortunately, 2,4-D and especially its esters also have a relatively high volatility, thus through natural vaporization considerable quantities of this herbicide are carried for rather long distances from the place of application. Thus, in many instances, susceptible crops have been damaged through the vaporized herbicide causing heavy financial loss to the crop and grower. For this reason, in many areas of the country the use of 2,4-D and especially its esters, is restricted or prohibited. This is especially true in areas where cotton, tomatoes, tobacco and truck crops are important. Unlike 2,4-D, the volatility problem of 2,3,6-trichlorophenylacetic acid cannot be corrected by making the less volatile aliphatic monohydric esters. The reason for this is that while the volatility of the simple aliphatic esters is reduced as the chain length increases, there is a corresponding large reduction of herbicidal activity making the esters of higher aliphatic monohydric alcohols of little commercial value. Unexpectedly, it has been found that the compositions of this invention not only have low volatility but retain their high degree of herbicidal activity, thus enabling these novel herbicides to be used where 2,4-D, 2,3,6-trichlorophenylacetic acid and the aliphatic monohydric alcohol esters of 2,3,6-trichlorophenylacetic acid would be preluded.

Perhaps even more unexpected than the discovered superiority of the phenyl esters over the 2,3,6-trichlorophenylacetic acid and its aliphatic esters, is the finding that of the entire class of phenyl, substituted phenyl and polysubstituted phenyl esters of 2,3,6-trichlorophenylacetic acid encompassed by this invention, the simple unsubstituted phenyl ester of 2,3,6-trichlorophenylacetic acid is superior to the substituted phenyls. This superiority of the unsubstituted phenyl ester is particularly surprising in view of the well known observation that substitution in the aromatic ring of phenyl and benzoic acids increases herbicidal activity, particularly halogen substitution. No explanation of this anomaly is offered.

It is further surprising that the phenyl ester may be made in good yield by direct esterfication of the acid by phenol. It is well known that the esterification of carboxylic acids by phenols is generally unsuccessful and that the more expensive route via the carboxylic acid chloride or anhydride must usually be resorted to in order to prepare phenyl esters.

While low volatility is an important attribute of the compositions of this invention, an equally important advantage of these herbicidal compositions is that their phytotoxicity toward many weeds persists for long periods of time after their application to the soil. As in the case of low volatility, the reason for this long term persistence in the soil is not obvious or well understood. For this reason, no theory of operation or mechanism is advanced but it is a major factor in the value of these compositions as soil sterilants, in volume crops such as sugar cane where frequent hand or grubbing mechanical cultivating is economically prohibitive. In addition, these compositions because of the low cost and high phytotoxicity toward a variety of weeds and grasses are especially useful as soil sterilants on low grade land such as public and private thoroughfares, road shoulders, railroad beds, right of way, and drainage and irrigation ditches. The compositions are especially phytotoxic toward weeds and grasses including among others, quackgrass, wild bluegrass, Johnson grass, wild carrot, ragweed, chicory, Canadian thistle, plantains, oxalis, daisy, yarrow, foxtail, field bindweed, hedge bindweed, milkweed, mustard and dock. An ancillary effect of the low volatility and long lasting phytotoxicity of the inventive compositions' is that they are especially advantageous in areas of high rainfall or in drainage and irrigation ditches where conventional herbicides such as the free 2,3,6-trichlorophenylacetic acid are leached out or lose their effectiveness. Thus, in crops such as pineapple, sugar cane, and the like, the herbicide need only be applied once during the growing season to effect full control of the weed population.

The compounds of this invention may be utilized as either the highly purified product or as the technical crude as well as states of purity intermediate to these purity extremes. They may be applied by themselves or diluted with liquid or solid carriers or diluents. Other herbicides, fungicides, insecticides or soil sterilants may be used as the diluents. For example, the compositions may be combined with other herbicides such as the phenylureas such as monourea or diurea, the triazines such as 2,4-dialkylamino-6-chloro-symtriazines, the chlorophenoxy aliphatic acids, the trichloroacetates, the chlorates, the N,N-dialkyl-N-arylurea, the borates, and the polychlorobenzoics. Optionally, the compositions may be combined with fungicides such as sulfur, captan or the metal dimethylthiocarbamates. Typical compatible insecticides are malathion, chlordane, DDT, benzene hexachloride and the like. Soil sterilants such as the alkali and alkaline earth metal chlorates and borates, the above mentioned triazines and ureas, appear to have an enhanced effect, greater than additive, by combination with the inventive compositions.

The compositions of this invention readily lend themselves to formulation ranging from the simple to most complex. They may be mixed with the conventional pest control and herbicide adjuvants, modifiers, diluents or conditioning agents so that they may be formulated as solutions, emulsions, dispersions, wettable powders or dusts. The diluents may be solids of varying particle size such as sawdust, clay, earth, mica, cereal flours, starches, diatomaceous earth and the like. Typical liquid carriers among other are water, petroleum fractions, liquid aliphatic or aromatic alcohols, esters, glycols and ketones. The liquid formulations whether solutions or dispersions, emulsions or wettable powder dispersions, may contain as a conditioning agent one or more surface active agents in amounts sufficient to impart the desired characteristics to the formulation. By the term surface active agent are included wetting agents, dispersing agents, emulsifying agents and the like.

There is considerable latitude and variation possible as to the mode and time of application of the inventive herbicidal compositions. For example, the compositions may be hand or machine broadcast, or disced or plowed into the soil or applied as a foliar spray or as a spray on the soil. The preferred procedure is to broadcast or spray the compositions on the soil prior to weed emergence. There is no special or critical time of application, this being largely determined by the convenience and preference of the user, except in the case of use in sugar cane where the preferred timing is at planting, at spring cultivation or at layby.

Similarly, the rate of application of the herbicidal composition is varied from one-half to one hundred pounds per acre, usually within the range of one to fifty pounds per acre, dependent upon several factors such as soil structure, climatic conditions, the stage of growth of the weed and crop, the type of weed or crop as well as whether sterilization or mere eradication of the weeds is sought. The preferred application rate depending upon so called average field conditions will be as follows: for controlling weeds for the few months of growing season in crop of average phytotoxic susceptibilities such as corn the rate will generally range from one to eight pounds per acre. Where weeds are to be eradicated from a more herbicide-resistant crop such as sugar cane, the rate of application will range from three to twelve pounds per acre while where the weeds to be eradicated are especially resistant mature plants of several years growth or long term total sterilization up to two to five years is desired, a range of ten to one hundred pounds per acre or higher may be used. Obviously, in soil sterilization the upper limit of rate of application is largely dictated by economic considerations.

The novel compositions of this invention are derived either from the esterification of a phenol with 2,3,6-trichlorophenylacetic acid or in the case of the unsubstituted phenyl ester, reacting the phenol with the 2,3,6-trichlorophenylacetyl chloride preferably in the presence of a base.

To illustrate the workings of this invention, representative non-limitative examples of the preparations, formulations and use of the invention are given below.

*Example 1.*—Preparation of 2,3,6-trichlorophenylacetic acid

To a solution of 37.5 parts by weight of sodium cyanide in forty parts by weight of water and one hundred and fifty parts by weight of ethyl alcohol maintained at reflux is added slowly one hundred and thirty-eight parts of 2,3,6-trichlorobenzyl chloride (prepared by the chlorination of 2,3,6-trichlorotoluene at a temperature ranging from ninety to one hundred and thirty degrees centigrade under the influence of a two hundred and fifty watt mercury vapor lamp). The reaction mixture is refluxed for four and one-half hours, filtered, evaporated to a solid and recrystallized several times from aqueous methanol. The product is a colorless crystalline solid melting at 58.9 degrees centigrade, identified as 2,3,6-trichlorobenzyl cyanide. When five hundred and eighty-eight parts by weight of the cyanide is heated for an hour with one thousand, eight hundred and sixteen parts by weight of sixty-five percent aqueous sulphuric acid at reflux temperature, and the reaction product washed with water and recrystallized from benzene, the pure colorless crystalline 2,3,6-trichlorophenylacetic acid melting at one hundred and sixty-one degrees centigrade is produced.

*Example 2.*—Preparation of 2,3,6-trichlorophenylacetyl chloride

Ten parts by weight of the 2,3,6-trichlorophenylacetic acid is heated for thirty minutes with forty parts by weight of thionyl chloride at the reflux temperature. The excess thionyl chloride is removed by distillation and the product distilled in a short path still yielding a nearly colorless liquid, boiling point one hundred and thirty-seven to one hundred and thirty-eight degrees centigrade (five millimeters), one hundred and twenty-nine to one hundred and thirty-one degrees centigrade (one millimeter) $N_D^{25}$ 1.5795.

*Analysis.*—Calcd. for $C_8H_4Cl_4O$: Cl, 55.1. Found: Cl, 55.1.

*Example 3.*—Phenyl 2,3,6-trichlorophenylacetate

Five parts of the acid chloride as prepared above was dissolved in ten parts of phenol and ten parts of pyridine added. When the heat of reaction subsided, the mixture was warmed at ninety to one hundred degrees centigrade for ten minutes. The product was taken up in ether and washed with water, then washed with dilute hydrochloric acid, and again with water, and finally stripped of solvent. The crude product was distilled and boiled at one hundred and fifty-five degrees centigrade (0.2 millimeter). The distillate was recrystallized from methanol to yield eighty percent of a colorless crystalline solid, melting point fifty-nine to sixty-one degrees centigrade.

*Analysis.*—Calcd. for $C_{14}H_9Cl_3O_2$: Cl, 33.7. Found: Cl, 34.8.

*Example 4.*—Phenyl 2,3,6-trichlorophenylacetate (alternate method)

A mixture of forty-eight parts of 2,3,6-trichlorophenylacetic acid, fifty-six parts of phenol, two parts of concentrated sulfuric acid, and three hundred and fifty parts of xylene were refluxed and water removed by continuous decantations of the distillate. After twelve hours of refluxing, the reaction mixture was washed with dilute sodium carbonate and with water, then stripped free of xylene and phenol, and the product distilled. The yield was fifty-six parts of phenyl 2,3,6-trichlorophenylacetate, boiling point one hundred and fifty-seven to one hundred and sixty-three degrees centigrade (0.35 millimeter), melting point fifty-eight to sixty degrees centigrade (after recrystallization, melting point 61.6 to 62.4 degrees centigrade).

*Analysis.*—Calcd. for $C_{14}H_9Cl_3O_2$: Cl, 33.7. Found: Cl, 34.8.

*Example 5.—Pentachlorophenyl 2,3,6-trichlorophenylacetate*

Twenty-five parts of 2,3,6-trichlorophenylacetyl chloride, fifty-two parts of pentachlorophenol, twenty parts of pyridine, and two hundred parts of benzene were refluxed for one-half hour, the mixture filtered hot, the filtrate washed with aqueous sodium carbonate, then washed with water, and finally concentrated under vacuum until crystallization occurred. Filtration yielded twenty-six parts of colorless solid, melting point 174.5 to 175.5 degrees centigrade.

*Analysis.*—Calcd. for $C_{14}H_4Cl_8O_2$: Cl, 58.2. Found: Cl, 56.8.

*Example 6*

By similar procedures the following aryl esters were prepared:

| Compound | M.P. (° C.) | B.P. (° C.) | Percent Cl Calcd. | Percent Cl Found |
| --- | --- | --- | --- | --- |
| p-Chlorophenyl 2,3,6-trichlorophenylacetate. | 72–3 | 185–192 (0.4 mm.) | 40.6 | 38.3 |
| o-Chlorophenyl 2,3,6-trichlorophenylacetate. | 83–84 | 183–189 (0.4 mm.) | 40.6 | 37 |
| 2,4-dichlorophenyl-2,3,6-trichlorophenylacetate. | 78–81 | 185 (0.2 mm.) | 46.3 | 45.5 |
| 2,4,5-trichlorophenyl 2,3,6-trichlorophenylacetate. | 132–8 | 202 (0.35 mm.) | 49.9 | 49.2 |
| 2,4,6-trichlorophenyl 2,3,6-trichlorophenylacetate. | 114–116 | 199–200 (0.35 mm.) | 49.9 | 49.8 |
| o-Hydroxyphenyl 2,3,6-trichlorophenylacetate. | 95–100 | 183–6 (0.3 mm.) | 32.2 | 29.4 |
| β-Naphthyl 2,3,6-trichlorophenylacetate. | 73.5–76.5 |  | 29.1 | 29.0 |
| α-Naphthyl 2,3,6-trichlorophenylacetate. | 127–127.5 |  | 29.1 | 28.6 |
| p-Tert-butylphenyl 2,3,6-trichlorophenylacetate. | 92–93 | (0.1 mm.) | 28.7 | 27.3 |
| o-Carboxyphenyl-2,3,6-trichlorophenylacetate. | gum |  |  |  |
| o- and p-Octylphenyl 2,3,6-trichlorophenylacetate. |  | 203 (0.2 mm.) | 25.0 | 24.2 |

*Example 7*

Field plots naturally infested with lamb's quarters, ragweed, plantain and witchgrass were plowed, disced, planted with ryegrass and sprayed with various chemicals at rates of one pound per acre in late spring. After two months, during which heavy rainfall occurred, the plots were inspected with the observations recorded below.

| Chemical | Average Weed Count Relative to Control (Percent) | | | | |
| --- | --- | --- | --- | --- | --- |
|  | Lamb's Quarters | Ragweed | Witchgrass | Plantain | Ryegrass |
| Phenyl 2,3,6-trichlorophenylacetate | 5 | 0 | 0 | 0 | 30 |
| 2-Hydroxyethyl-2,3,6-trichlorophenylacetate | 40 | 5 | 20 | 0 | 60 |
| 2-Butoxyethyl 2,3,6-trichlorophenylacetate | 20 | 0 | 20 | 10 | 60 |
| Sodium 2,3,6-trichlorophenylacetate | 20–30 | 0 | 20 | 0 | 60 |
| 2,3,6-trichlorophenylacetic acid | 20–30 | 0 | 20 | 0 | 50 |
| p-chlorophenyl dimethyl urea (commercial herbicide) | 20 | 10 | 20 | 90 | 10 |
| Control | 100 | 100 | 100 | 100 | 100 |

These data indicate the high activity of the phenyl ester on both broadleaf weeds and seeded grasses.

*Example 8*

Tests similar to those described in the above example were run at the rate of four pounds of active ingredient per acre.

| | Control Rating | |
| --- | --- | --- |
| | Pre-Emergence on Broadleaf Weeds | Pre-Emergence on Grasses |
| Phenyl | 4 | 4 |
| o-Chlorophenyl | 2 | 2 |
| p-Chlorophenyl | 2 | 2–3 |
| 2,4-dichlorophenyl | 1 | 1 |
| 2,4,5-trichlorophenyl | 1–3 | 0 |
| Pentachlorophenyl | 1 | 0 |
| α-Naphthyl | 1 | 1 |
| Octylphenyl | 1 | 1 |
| n-Hexyl | 0–0.5 | 0–0.5 |
| Lauryl | 0–0.5 | 0–0.5 |

Scale: 0=no control; 1=slight control; 2=fair control; 3=good control; 4=100% control.

*Example 9*

Comparative volatility tests were made as follows: Healthy tomato plants of four to six inch height were individually covered by inverted four thousand milliliter beakers. Under each beaker was placed an open one hundred millimeter petri dish containing a circle of blotting paper impregnated with one gram of the various test compounds. The paper was not in contact with any part of the plant nor the soil in which the plant was growing. After two days, the tomato plants were examined for symptoms of phytotoxicity caused by exposure to the vapors of the test compounds. Severe epinasty and leaf curling was noted with the methyl, ethyl, isopropyl and n-butyl esters of 2,3,6-trichlorophenylacetic acid and with the free acid. At most a trace of deformation was noted with the plants thus exposed to the phenyl, cresyl, and β-naphthyl esters of 2,3,6-trichlorophenylacetic acid.

We claim:

Phenyl 2,3,6-trichlorophenylacetate.

References Cited by the Examiner

UNITED STATES PATENTS

| | | | |
| --- | --- | --- | --- |
| 2,396,513 | 3/46 | Jones | 260—473 |
| 2,726,947 | 12/55 | Baumgartner | 71—2.6 |
| 2,731,339 | 1/56 | Davie | 71—2.6 |
| 2,958,705 | 11/60 | Gordon et al. | 260—476 |
| 2,960,532 | 11/60 | Gordon et al. | 260—476 |
| 2,977,212 | 3/61 | Tischler | 260—476 |

OTHER REFERENCES

Frear: J. Econ. Entomology, vol. 40, pp. 736–41 (1947).

Fuson: Advanced Organic Chemistry (New York, 1950), pages 82–84.

Groggins: Unit Processes In Organic Synthesis (New York, 1952), pages 602–611.

Marth et al.: Botanical Gazette, June 1949, pages 632–636.

McNew et al.: Iowa State Coll. J. Sci., 24, No. 2, page 205 (1950).

LORRAINE A. WEINBERGER, *Primary Examiner.*

IRVING MARCUS, DUVAL T. McCUTCHEN, LEON ZITVER, *Examiners.*